P. H. MELLON.

Quilting Frame.

No. 3,262. Reissued Jan'y 12, 1869.

Witnesses:
H. C. Ashkettles
Wm. A. Morgan

Inventor:
P. H. Mellon
By Munn & Co
Attorneys

N. PETERS, Photo-Lithographer, Washington, D. C.

United States Patent Office.

PETER H. MELLON, OF ST. LOUIS, MISSOURI.

*Letters Patent No.* 78,989, *dated June* 16, 1868; *reissue No.* 3,262, *dated January* 12, 1869.

IMPROVED QUILTING-FRAME.

The Schedule referred to in these Letters Patent and making part of the same.

*To all whom it may concern:*

Be it known that I, PETER H. MELLON, of St. Louis, in the county of St. Louis, and State of Missouri, have invented a new and useful Improvement in Quilting-Frames; and I do hereby declare that the following is a full, clear, and exact description thereof, which will enable those skilled in the art to make and use the same, reference being had to the accompanying drawings, forming part of this specification.

This invention relates to new and useful improvements in quilting-frames, whereby they are made more convenient for use than quilting-frames of ordinary construction; and It consists in the peculiar construction and arrangement of parts by which the quilt may be shifted, the frame taken apart and put together, or adjusted to any required height, with the greatest facility, as will be hereinafter more fully described.

In the accompanying plate of drawings—

Similar letters of reference indicate corresponding parts.

Figure 1:
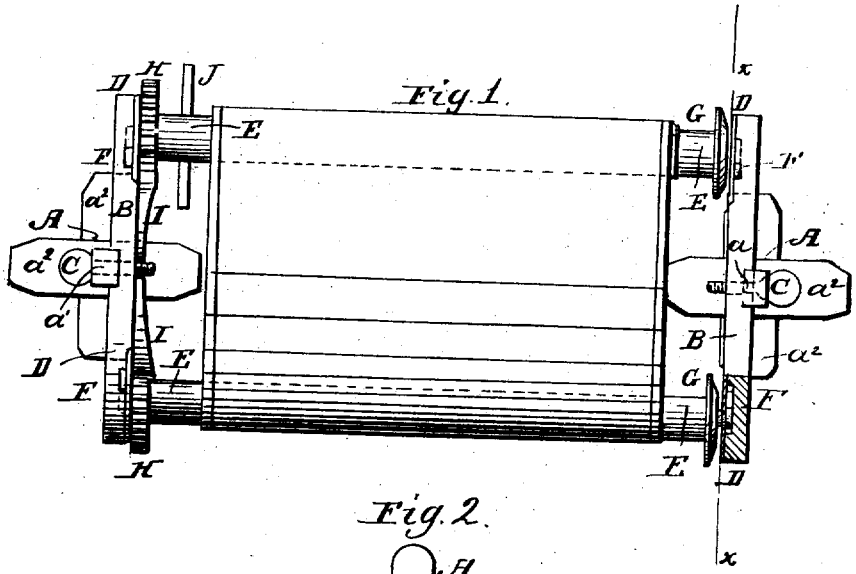
Figure 1 represents a top or plan view.

$a^1\ a^2$ represent the base which supports the frame.

A are the uprights, which are so attached to the base $a^1\ a^2$, that they may be readily removed therefrom.

B represents the transverse bars to which the rollers E are attached, which bars are made adjustable on the uprights, by screw-bolts C passing through either slots or holes in the uprights, and through the bars, as seen in the drawing.

Figure 2:
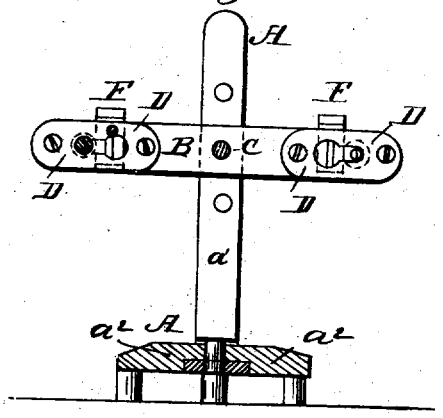
Figure 2 is a vertical section, through the line $x\ x$ of fig. 1.

The rollers E are made each in two parts, (or semi-circles,) as seen in fig. 2, between which pieces the quilt is held by the thimbles on the collars $g$ and on the ratchet-wheels H.

D represents metallic plates on the inside of each end of the bars B, which are slotted to receive the heads of the roller-journals E, one end of such slots being made large to receive the heads of the journals, and the other small, so that the heads cannot pass through them.

F represents sliding keys, which pass down in grooves between the plates I and the bars B, so as to cover the large end of the slots through the plates, to prevent the journals from working out.

The vertical movement of the keys F is controlled by slots through the keys, which receive pins or screws attached to the bars, as seen in the drawing.

I represents ratchet-pawls, which engage with the ratchet-teeth, for holding the rollers in position, while the quilt is stretched thereon.

By this arrangement the quilt may be raised, or lowered, or changed in any desired manner, with the greatest ease.

I claim as new, and desire to secure by Letters Patent—

1. The metallic plates D and keys F, constructed and arranged in combination with the rollers E, substantially as and for the purposes set forth.

2. In combination with the rollers E, metallic plates D and keys F, the thimbles on the collars $g$, and the ratchets I, substantially as shown and described.

PETER H. MELLON.

Witnesses:

EUGENE JACCARD,
J. R. HURSKAMP.